United States Patent

[11] 3,617,993

| [72] | Inventors | Harold Lee Massie<br>Trenton;<br>Bruce Elson Mount, Wayne, both of N.J. |
|---|---|---|
| [21] | Appl. No. | 856,759 |
| [22] | Filed | Sept. 10, 1969 |
| [45] | Patented | Nov. 2, 1971 |
| [73] | Assignee | Hoffmann La Roche Inc.<br>Nutley, N.J.<br>Continuation-in-part of application Ser. No. 830,681, June 5, 1969, now abandoned. |

[54] CW DOPPLER TRANSCEIVER SYSTEM
10 Claims, 6 Drawing Figs.

[52] U.S. Cl........................................................ 340/1 R,
340/3 D, 343/8
[51] Int. Cl....................................................... G01s 9/66

[50] Field of Search............................................ 340/1, 3, 3
D; 73/194 A, 67.6–67.9; 343/7.7, 8

[56] References Cited
UNITED STATES PATENTS
3,121,856  2/1964  Finney........................... 340/3
3,498,290  3/1970  Shaw et al...................... 73/194 A

*Primary Examiner*—Richard A. Farley
*Attorneys*—Samuel L. Welt, Jon S. Saxe, Bernard S. Leon and Jacob Frank

ABSTRACT: A transceiver system for processing a Doppler signal, utilizing a common transmit-receive transducer driven by a high-frequency RF-square wave amplitude limited signal for eliminating AM transmitter noise, and a receiver for amplitude-demodulating the received RF output of the transducer to provide a Doppler frequency output.

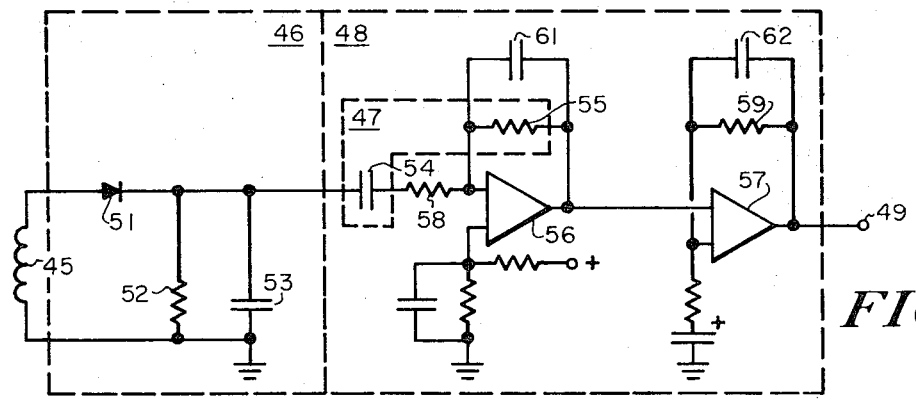
FIG. 3
FIG. 4
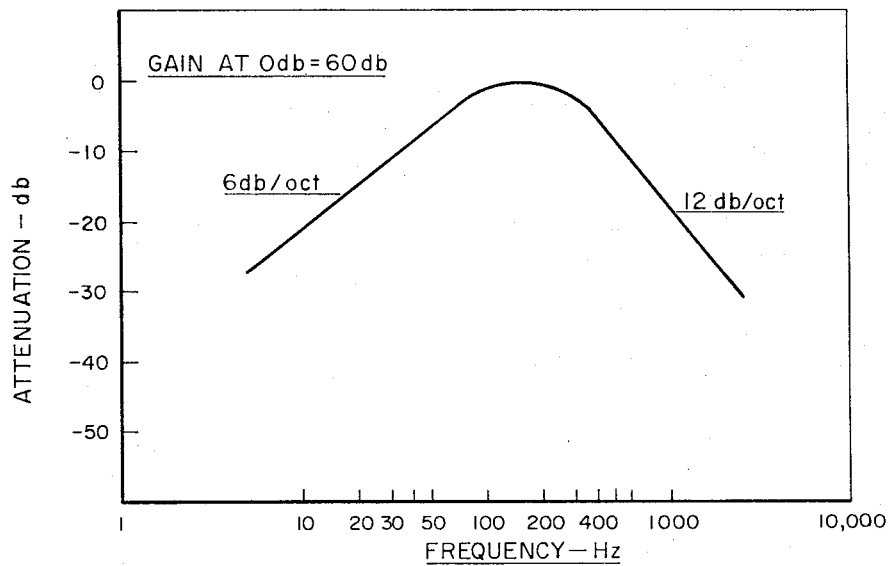
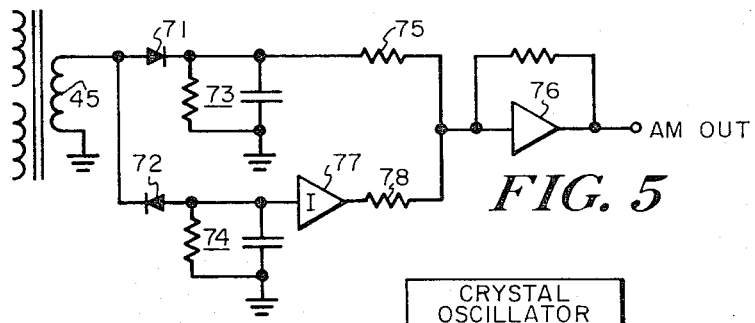
FIG. 5
FIG. 6
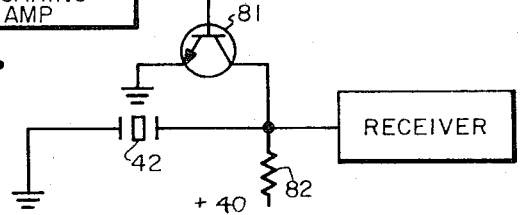

3,617,993

CW DOPPLER TRANSCEIVER SYSTEM

RELATED APPLICATION

This is a continuation-in-part of now abandoned application Ser. No. 830,681 filed June 5, 1969 and entitled Reconstruction of Reflecting Surface Velocity and Displacement from Doppler Signals.

BACKGROUND OF THE INVENTION

1. Field of the Invention

This invention relates broadly to a transceiver system for processing Doppler signals.

2. Description of the Prior Art

In the monitoring of surfaces which move relative to a reference surface, various detection techniques employing high radio frequencies (radar), ultrasound or other energy forms are well known. One of these techniques that is commonly used, is the continuous wave Doppler technique which includes evaluation of the modulation product of emitted and reflected energy. When an accurate measure of the distance traveled versus time is desired, the frequency of the Doppler-shifted energy is compared to the frequency of the transmitted energy and the difference in frequency is measured, generally by counting cycles or zero crossings per unit time of the differential frequency.

Amplitude-demodulating systems have been utilized in detecting the Doppler-shifted signals, which include separate transducers for the transmitting and receiving functions. Isolation is included between the transducers to provide low leakage of unmodulated carrier into the receive transducer. Such need for isolation makes transducer construction more difficult and has precluded use of common transmit and receive elements. Should a common transmit-receive crystal have been used in the prior art, a low percent of signal modulation would have resulted in giving a very poor signal to noise ratio due to the relatively large amount of AM noise present on the transmitted waveform.

SUMMARY

The present invention is directed to a transceiver system for use in detecting the Doppler shift frequency reflected from a moving surface with incident continuous wave (CW) ultrasound or electromagnetic waves, using AM detection and common transducer elements for transmitting and receiving. This is achieved by squaring the RF output waveform of an oscillator and then limiting the AM noise applied to the transducer by employing a saturable switching power amplifier. In addition, the power amplifier has a high output impedance as compared with the equivalent transducer impedance to insure the maximum transfer of reflected energy from transducer to receiver.

It is a further object to provide such a transceiver in which the energy received at the transducer is amplitude demodulated and differentiated to provide a peak output signal proportional to the velocity of the moving surface.

Yet another object of the present invention is to provide in such a transceiver system an amplitude demodulator which eliminates apparent AM modulation resulting from zero-crossing detection errors in squaring of the RF-generated energy. Other objects, advantages and capabilities of the present invention will become apparent from the following detailed description, taken in conjunction with the accompanying drawings, showing only preferred embodiments of the invention.

BRIEF DESCRIPTION OF THE DRAWINGS

FIG. 3 illustrates one form of a receiving circuit in greater detail.

FIG. 4 is a graphic illustration of attenuation versus frequency characteristic of the receiver circuit shown in FIG. 3.

FIG. 5 shows an alternate embodiment for the receiver AM detector 46 shown in FIG. 1.

FIG. 6 depicts an alternate embodiment of the transceiver system.

DESCRIPTION OF THE PREFERRED EMBODIMENTS

Figure 1:
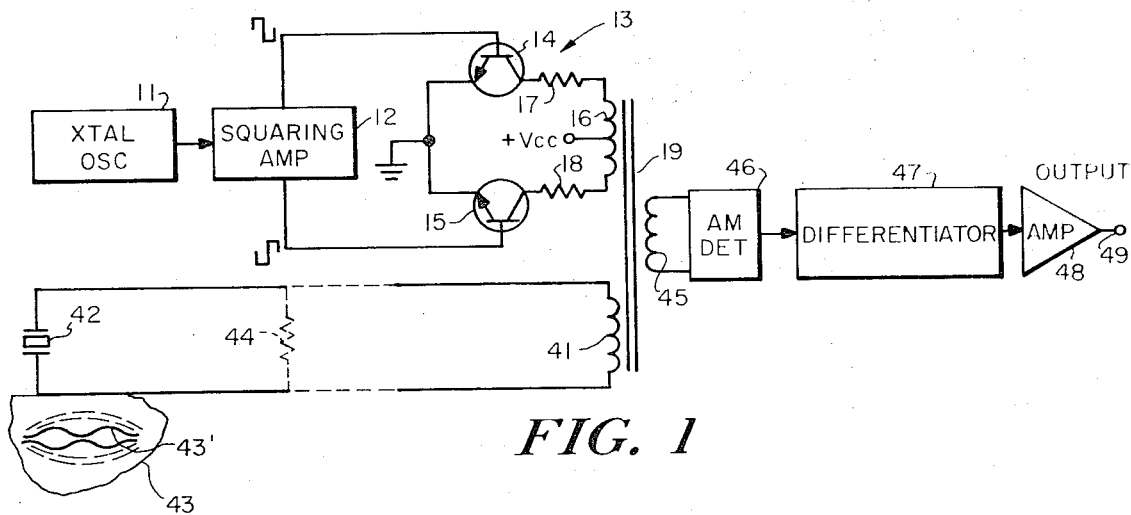
FIG. 1 is a schematic diagram of a transceiver system according to the present invention.

With reference to the drawings, there is shown in FIG. 1, a high frequency generator comprising a crystal oscillator 11, having a frequency of, for example 2 MHz, feeding a squaring amplifier 12, for detecting zero crossings of the sinusoidal output waveform of oscillator 11. The square wave outputs of squaring amplifier 12 are connected to bases of transistors 14 and 15 of a switching amplifier 13. The emitters of transistors 14 and 15 are grounded and their collectors are connected to opposite ends of a coil 16 of transformer 19 via resistors 17 and 18, respectively. The center of coil 16 is supplied, from a suitable power source, by a positive potential VCC if transistors 14 and 15 are NPN and a negative potential VCC if transistors 14 and 15 are PNP.

Figure 2:
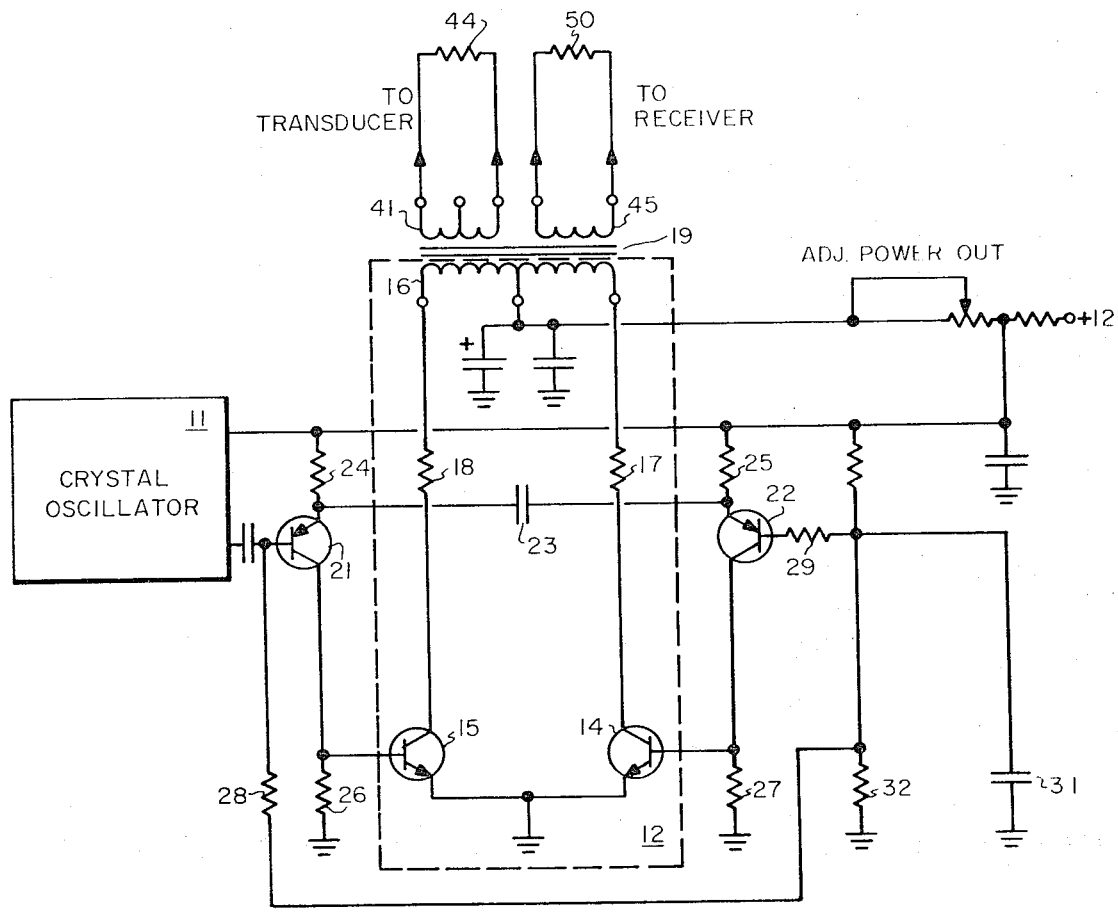
FIG. 2 shows one form of a transmitting circuit in greater detail.

One form of a squaring amplifier 12 for the transmitter is illustrated in circuit form in FIG. 2, along with switching amplifier 13 and transformer 19, wherein there is shown a pair of transistors 21 and 22. Transistor 21 is capacitively coupled to oscillator 11. The emitters of transistors 21 and 22 are AC-coupled via capacitor 23, and in addition are connected through resistors 24 and 25 respectively to a fixed potential. The collectors of transistors 21 and 22 are connected to the bases of transistors 15 and 14 respectively and to ground through resistors 26 and 27 respectively. The base of transistors 21 and 22 are coupled via resistor 28 and 29, respectively to ground for an AC reference potential via capacitor 31. For a 2 MHz crystal oscillator, the following are selected values for R and C components of the squaring amplifier and switching detector:

| | |
|---|---|
| R 24 and R 25 each | 3,300 ohms |
| R 26 and R 27 each | 1,000 ohms |
| R 17 and R 18 each | 150 ohms |
| R 28 and R 29 each | 5,600 ohms |
| R 32 | 3,300 ohms |
| C 23 | 0.018 microfarads |
| C 31 | 0.1 microfarads |
| Transducer Impedance | 100 ohms |

In operation of the transmitting circuit, squaring amplifier 12 operates as a nonsaturating limiter allowing for better accuracy in detecting zero crossings and alternately driving transistors 14 and 15 into saturation and cutoff thus providing adequate power to transformer 19 with a minimum of AM noise by having effectively limited AM modulation. For example, transistors 22 and 21 are initially forward biased and conducting equally fixed currents. As the positive upgoing swing of the sinusoidal output of crystal oscillator 11 crosses zero, the potential at the base of transistor 21 will become more positive, causing the collector current of transistor 21 to drop to zero thereby turning off transistor 15. Current then flows from and through parallel resistors .24 and 25 through transistor 22 and resistor 27 to supply current at the base of transistor 14 causing transistor 14 to switch into conduction whereby a fixed collector current through a low-valued resistor 17 quickly saturates transistor 14 to limit AM modulation and provide an amplified transmission signal of sufficient power through the upper half of coil 16 of transformer 19. In a similar fashion, as the negative going swing of the sinusoidal output of crystal oscillator 11 crosses zero, nonsaturating limiting transistor 21 is turned on with transistor 22 turned off, whereby power amplifying transistor 15 is switched into conduction and quickly saturated to provide a signal through the lower half of coil 16.

In referring back to FIG. 1, also coupled with transformer 19 is a coil 41 having a two to one turns ratio with each half of coil 16. Connected in parallel with coil 41 is transducer element 42 adapted to generate an ultrasonic wave pattern directed through a medium 43 at a frequency determined by crystal oscillator 11. The transducer element is used for simultaneous transmitting and receiving. In addition, it is to be noted that the value of output resistance 17 or 18 of the transmitter from coil 16 is to be large compared to the equivalent transducer resistance, denoted as 44, so that excessive received energy from a moving surface 43' in a medium 43 at the transducer 42 is not shunted to ground. In the present case, where coil 41 has a turns ratio of 2 to 1 with each half of coil 16, the transmitter output impedance as seen at the output terminals of coil 41 will be the turns ratio squared times resistor 17 or 18, i.e. 4×150 ohms, or 600 ohms.

At the receiving end of the transceiver is a coil 45 having a turns ratio with coil 41 sufficient to properly match transducer impedance 44 to the receiver equivalent impedance 50. Coil 41 is connected to an AM detector 46 such as an envelope detector, a product detector using a reference shifted by $\pi/2$ radians, or another suitable detector. A specially developed AM detector will be discussed, hereinafter with reference to FIG. 5 which supplements the present invention by further reducing AM noise, caused by the zero-crossing errors introduced by squaring amplifier 12. If desired, the transducer cable at coil 41 can be directly connected to the receiver input in parallel with coil 41 eliminating the need for coil 45. One advantage, however, of using separate coil 45 is greater isolation of the transducer for patient safety where the transceiver is to be used for applying ultrasound to a human subject. Another advantage is greater common mode rejection for interferring signals. A differentiator 47 is coupled from AM detector 46 to an output amplifier unit 48 having an output terminal 49.

With reference to FIG. 3 there is illustrated one form which the receiver circuitry may take for evaluating a moving surface 43' where the rate of modulation of a 2 MHz carrier (Doppler frequency) lies in a range of frequencies of interest from about 25 to 600 H. In FIG. 3 the AM detector 46 comprises diode 51, resistor 52 capacitor 53. The input signal is rectified by diode 51 and capacitor 53 charges to the voltage drop across resistor 54 and then discharges when diode 51 is nonconducting to provide an output voltage which is essentially the carrier envelope.

The differentiating network 47 is formed of capacitor 54 and resistor 55 whereby the output is taken across resistor 55 and applied to amplifiers 56, 57 connected in cascade, whereby resistors 58, 59 and capacitors 61, 62 together with the differentiator impedance are designed with preferred values such as those specified below, to provide a frequency response versus attenuation as depicted in FIG. 4.

| R 55 | 221,000 ohms | C 54 | 0.82 microfarads |
| R 58 | 1,000 ohms | C 61 | 0.0022 microfarads |
| R 59 | 100,000 ohms | C 62 | 0.0033 microfarads |

An alternate embodiment of the AM detector 46 which further enhances limiting of AM noise, is depicted in FIG. 5. As previously discussed the transmitter is operated in a switching mode to minimize AM noise appearing on the transmitter, however, noise in zero-crossing detection can also cause noise seen at the AM detector which results in an asymmetrical waveform caused by a change in the DC reference of the waveform when AC-coupled via a transformer or capacitor. The resulting envelope appears as AM modulation to a conventional AM detector, however, this "modulation" differs from true AM modulation since both the positive and negative envelopes are in phase. The below discussed detector ignores the envelope produced by asymmetry.

With respect to the detector shown in FIG. 5, there is shown a pair of oppositely poled diodes 71,72 their outputs being connected via impedances 73 and 74 respectively, to ground. The output of diode 71 is also connected via resistor 75 to a summing amplifier 76 and the output of diode 72 is additionally connected via inverter 77 and resistor 78 to summing amplifier 76. In operation, the positive portion of the asymmetrical signal is passed by diode 71, the negative portion by diode 72 and inverted, so that the signal is cancelled out by summing amplifier 76. If desired, the resistors 75, 78, inverter 77 and summing amplifier 76 could be replaced by a fixed gain difference amplifier.

OPERATION

In operation, transducer 42 is placed in or adjacent medium 43 which contains a moving surface 43' the velocity of which is to be detected. If 43 were to be a human subject, surface 43' could, for example, be an arterial wall, a portion of a heart, a fetus, etc., and ultrasonic energy would be the energy form radiated by transducer 42. The 2 MHz RF signal generated by crystal oscillator 11 is squared off by the zero crossing detecting in squaring amplifier 12 and then limited and amplified by switching amplifier 13 to transmit sufficient power, via a step-up transformer 19, for driving transducer 42 to generate a 2 MHz ultrasonic wave directed at surface 43'. The ultrasonic energy reflected from moving surface 43' is then received by the same transducer 42 and fed to the receiver circuitry via transformer 19. Since the effective output impedance of the transmitter is high compared to the transducer impedance little signal is lost by the shunting effect of the transmitter impedance.

In the receiver circuitry, the received signal is amplitude demodulated and its envelope is differentiated to provide, in effect, the Doppler-shifted signal representative of the velocity of surface 43', as it has been shown in applicants' referenced copending application that if the received Doppler-shifted signal is always much lower in magnitude than the unmodulated carrier present during demodulation (e.g. a 50 to 1 ratio), the resulting amplitude modulation of the received complex signal is closely related to the integral of the frequency modulation.

ALTERNATE EMBODIMENT

With reference to FIG. 6 there is illustrated an alternate embodiment of the present invention in which the switching amplifier and transformer are substituted for by switching-amplifying transistor 81. In operation, during the negative half of the high frequency RF square wave applied to the base of transistor 81 the NPN transistor is switched off, and current is supplied to transducer 42 from +40 via resistor 82 (600 ohms) to develop a drive voltage across transducer 42 at a 2 MHz rate. During the positive half of the square wave swing transistor 81 is turned on, +40 is shunted to ground, and the transducer is discharged through ground. An advantage of this embodiment is the elimination of DC errors in zero-crossing detection at the squaring amplifier, because of ground reference (no AC coupling). When applying ultrasound to a human subject, a disadvantage of the alternate embodiment is the absence of patient isolation from the transmitter and/or the receiver, that would otherwise be obtained by use of a transformer.

We claim:

1. A transceiver system for processing a Doppler signal comprising,
    common transducer means for directing energy to and receiving energy reflected from a moving surface,
    transmitter means for driving said transducer means with a high frequency RF square wave amplitude limited signal for eliminating AM transmitter noise,
    receiver means coupled from said transducer means for amplitude-demodulating signals representative of said reflected energy to provide a Doppler frequency output, and
    means for providing a high transmitter output impedance as compared with the impedance at said transducer means enabling maximum transfer of reflected energy from said transducer means to said receiver means.

2. A transceiver system for processing a Doppler signal comprising,
common transducer means for directing energy to and receiving energy reflected from a moving surface,
transmitter means for driving said transducer means with a high frequency RF square wave amplitude-limited signal for eliminating Am transmitter noise,
receiver means coupled from said transducer means for amplitude-demodulating signals representative of said reflected energy to provide a Doppler frequency output,
said transmitter means including means for generating a high frequency RF sinusoidal waveform, and
squaring amplifier means connected from said generator means for detecting the zero crossings of said sinusoidal wave to provide said high frequency RF square wave.

3. Apparatus according to claim 2 wherein
said transmitter means further includes a saturable switching amplifier means connected from said squaring amplifier means for amplitude-limiting said high frequency RF square wave.

4. Apparatus according to claim 3 including
transformer means for coupling said transmitter means to said transducer means.

5. Apparatus according to claim 2 wherein,
said receiver means includes a dual-channel detector coupled to the transducer means, having oppositely poled diodes in parallel paths and coupled to difference means for eliminating AM noise caused by asymmetrical waveforms at the transmitter.

6. A transceiver system for processing a Doppler signal comprising,
common transducer means for directing energy to and receiving energy reflected from a moving surface,
transmitter means for driving said transducer means with a high frequency RF square wave amplitude limited signal for eliminating AM transmitter noise, and
receiver means coupled from said transducer means for amplitude demodulating signals representative of said reflected energy to provide a Doppler frequency output,
said receiver means including means for differentiating said amplitude-demodulated signals to provide an output representative of the surface velocity.

7. Apparatus according to claim 6 wherein said receiver means includes envelope detector means coupled to said differentiating means, for performing said amplitude demodulating.

8. A method for processing a Doppler signal resulting from a frequency shift of a carrier signal by reflection from a moving surface comprising the steps of:
driving a common transmit-receive transducer with a high frequency RF square wave amplitude limited signal-minimizing AM-transmitting noise,
amplitude-demodulating the reflected energy received by the common transducer to provide a Doppler frequency output, and
presenting a high output impedance at the driving stage output, as compared with the transducer impedance to maximize the reflected energy signal transfer from the transducer to be amplitude demodulated.

9. A method according to claim 8 including the step of differentiating the amplitude modulated signal to provide an output representative of the surface velocity.

10. A transceiver system for processing a Doppler signal comprising,
common transducer means for directing energy to and receiving energy reflected from a moving surface
transmitter means for driving said transducer means with a high frequency RF square wave amplitude limited signal for eliminating AM transmitter noise, and
receiver means coupled from said transducer means for amplitude-demodulating signals representative of said reflected energy to provide a Doppler frequency output,
said receiver means including a dual-channel detector coupled to the transducer means, having oppositely poled diodes in parallel paths and coupled to difference means for eliminating AM noise caused by asymmetrical waveforms at the transmitter.

* * * * *